March 17, 1953
H. DOROGOFF
2,631,390
AUTOMOBILE COMPARTMENT MAP HOLDER
Filed June 12, 1948
2 SHEETS—SHEET 1
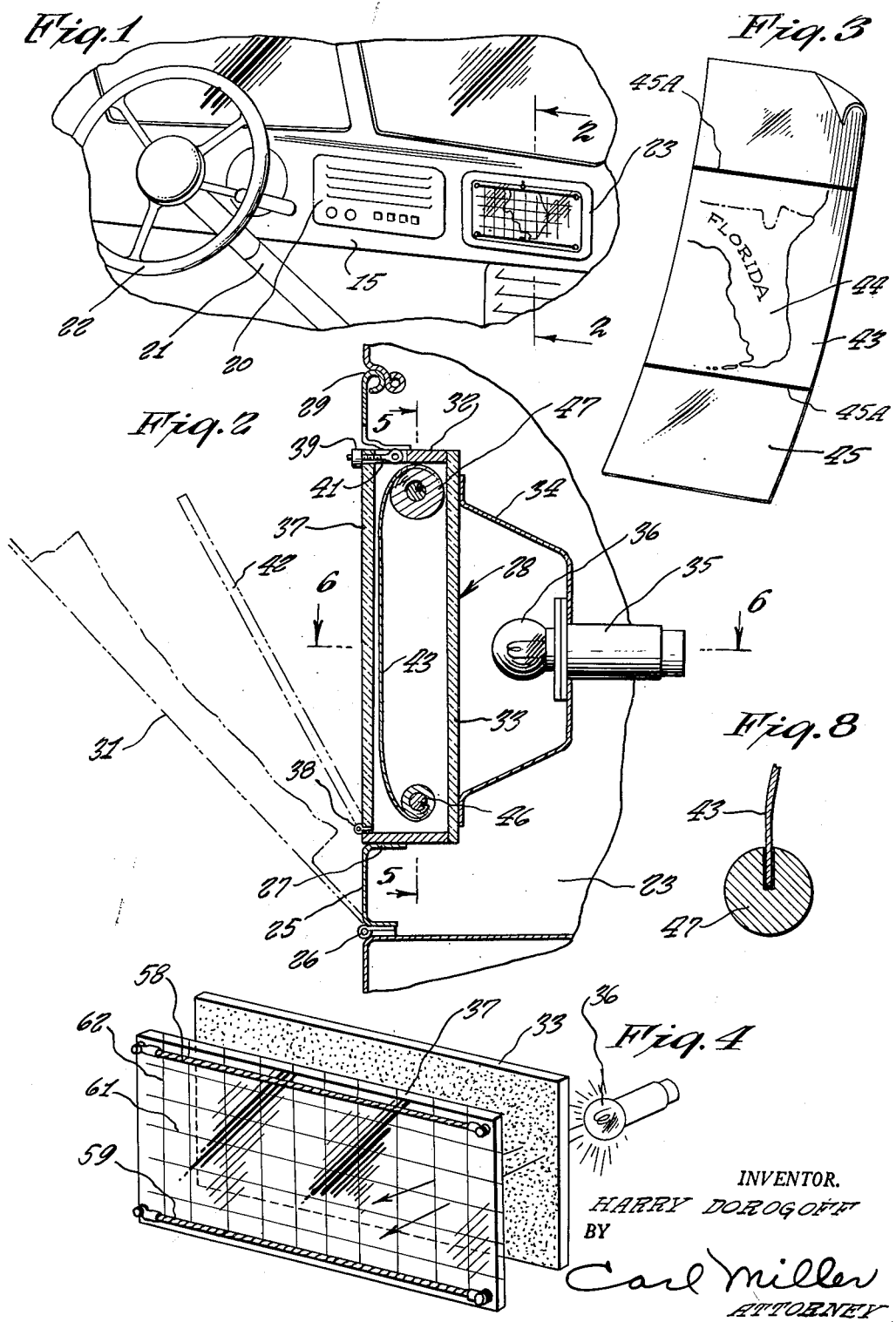
INVENTOR.
HARRY DOROGOFF
BY
Carl Miller
ATTORNEY March 17, 1953      H. DOROGOFF      2,631,390
AUTOMOBILE COMPARTMENT MAP HOLDER
Filed June 12, 1948      2 SHEETS—SHEET 2
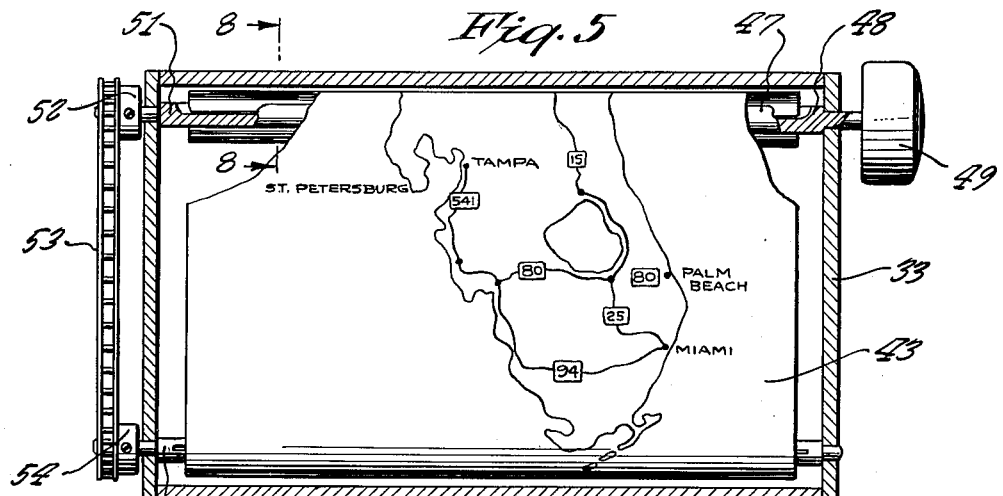
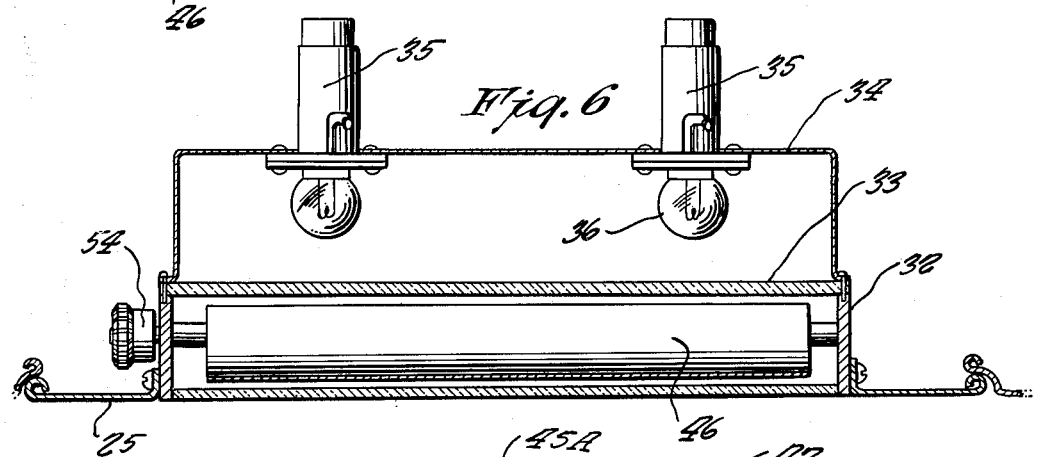
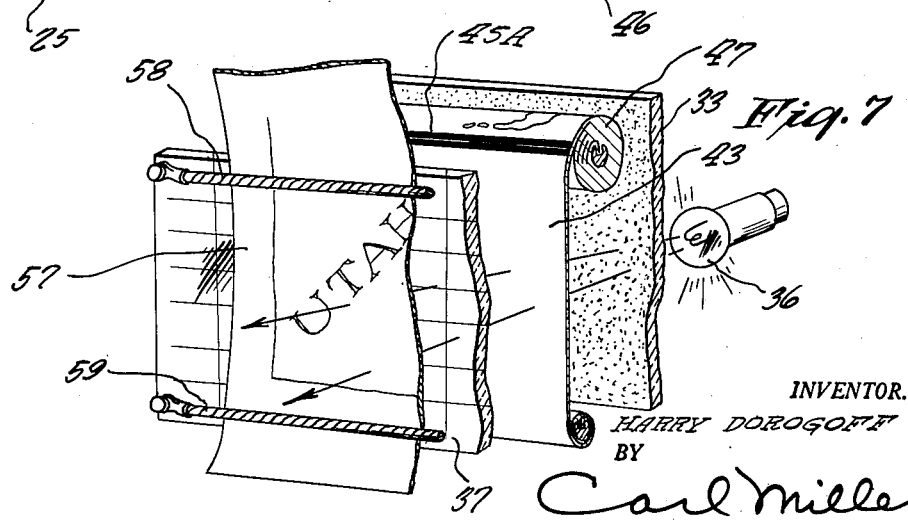
INVENTOR.
HARRY DOROGOFF
BY Carl Miller
ATTORNEY Patented Mar. 17, 1953

2,631,390

UNITED STATES PATENT OFFICE 2,631,390

AUTOMOBILE COMPARTMENT MAP HOLDER

Harry Dorogoff, Newark, N. J.

Application June 12, 1948, Serial No. 32,635

1 Claim. (Cl. 40—86)

This invention relates to map holders for automobiles.

It is an object of the present invention to provide a map holder arrangement which is built into the automobile dash compartment and which can be pulled out with the cover to effect the adjustment of the map and which can be returned to a closed position to close the compartment and so the map can be viewed and wherein there is provided on the exterior of the compartment door elastics between which map material can be extended to be viewed and wherein the compartment has a frosted glass and lights which shine behind the glass to provide a good showing of the map located in front of the glass.

Other objects of the present invention are to provide a compartment map holder for automobiles which is lighted, which is of simple construction, easy to adjust, consumes little space, and efficient in operation.

For other objects and for a better understanding of the invention, reference may be had to the following detailed description taken in connection with the accompanying drawing, in which Fig. 1 is a perspective view of an automobile compartment and dash, on the door of the compartment there being the map arrangement of the present invention.

Fig. 2 is an enlarged sectional view, in elevation, taken on line 2—2 of Fig. 1.

Fig. 3 is a perspective view of a map adapted to be carried by the compartment.

Fig. 4 is an exploded view of certain of the parts and illustrating the manner in which light is provided for and extended onto the map.

Fig. 5 is a transverse sectional view taken on line 5—5 of Fig. 2.

Fig. 6 is a transverse sectional view taken on line 6—6 of Fig. 2.

Fig. 7 is an illustrative view showing how the light is used to be extended onto a map not contained on the rolls but located on the exterior of the compartment door with the roll extended so as to provide a plain paper section through which the light may shine on picturing the exterior map.

Fig. 8 is a detail sectional view taken on line 8—8 of Fig. 5.

Referring now to the figures, 15 represents an automobile dashboard disposed in the driver's compartment of the automobile and which has a radio 20, a steering post 21, a steering wheel 22 and a glove compartment 23. On this glove compartment there is hinged a door 25 at 26. This door is specially formed with an opening 27 for receiving my map holder device 28. My map holder device is a self-contained unit and can be separated from the door 25 or inserted therein with little difficulty. The door 25 has the usual catch 29 for holding it closed. The door can be swung down to a dotted line position as indicated at 31, Fig. 2.

The device 28 comprises a casing or box-like structure 32 with a ground glass bottom 33 having a bracket 34 thereon for supporting lamp sockets 35 and lamp bulbs 36 whereby light rays may be extended through the frosted bottom 33. On the front of the box 32 there is hingedly connected another ground glass or transparent member 37 which is hinged at 38 to the lower edge of the box and which may be secured to the top of the box by a nut 39 threaded onto a pivoted element 41.

The cover 37 can be brought forwardly to a dotted line position as indicated at 42 in Fig. 2 and access can be had to a map 43 having a map area 44 and transparent end portions 45 adapted to be respectively connected into rollers 46 and 47. The roller 47 has a shaft projection 48 with a knob 49 thereon. On the opposite end of the roller is a projection 51 on which is a sprocket 52. A chain 53 is extended over the sprocket 52 and is connected to a sprocket 54 on the roller 46. Map area 44 and end portions 45 are separated by opaque black lines 45A.

When the door 25 is hinged forwardly, access can be easily had to the knob 49. By turning the knob, the proper position of the map can be had. The light will show up the lines of the map very clearly. With the connection of the chain, both rollers are turned simultaneously.

If it is desired to place another map so as to receive the light without having to remove the map which is placed on the rollers, the map on the rollers is turned to present a plain portion 45, Fig. 7, and the light is permitted to shine through the transparent glass 37 so as to display a map 57 held between elastics 58 and 59 fixed at the top and bottom of the plate 37. The plate 37 has transverse and vertically extending lines 61 and 62 which serve as a means for determining the mileage between towns on the map.

While various changes may be made in the detail construction, it shall be understood that such changes shall be within the spirit and scope of the present invention as defined by the appended claim.

Having thus set forth and disclosed the nature of my invention, what is claimed is:

In combination, an instrument panel having a door opening and a compartment therebeyond, a door hinged in the opening and adapted to be drawn outwardly therefrom, a box structure permanently secured to the door, said box structure having an inner plate of translucent material thereon, vertically spaced horizontally extending rollers secured for rotation, respectively, at the top and bottom of the said box, a knob extending from one of the rollers, said knob being accessible when the compartment door is pivoted outwardly with the box structure, drive means extending between said rollers, a bracket secured to the translucent plate of the box structure, a light source secured to the bracket in the rear of the translucent plate, a transparent plate hinged to the outer portion of the box structure and having lines thereon through which the mileage on a map may be determined, the map being extended over the rollers and adapted to be drawn into a position in rear of the transparent plate, said transparent plate serving as a cover for the said box, a pivotable element adjustable upon the said box to engage the transparent plate and hold it in closed position, said map having a map area and translucent end portions separated by opaque lines, whereby with the turning of the rollers the translucent end portions may be presented to condition the structure for a display of a map rested over the hinged translucent plate.

HARRY DOROGOFF.

REFERENCES CITED

The following references are of record in the file of this patent:

UNITED STATES PATENTS

| Number | Name | Date |
| --- | --- | --- |
| 876,141 | Boyer | Jan. 7, 1908 |
| 997,166 | Weber | July 4, 1911 |
| 1,395,509 | Mason et al. | Nov. 1, 1921 |
| 1,612,407 | Wells | Dec. 28, 1926 |
| 1,701,696 | Parsons | Feb. 12, 1929 |
| 1,711,917 | Berglund | May 7, 1929 |
| 1,757,458 | Garbut et al. | May 6, 1930 |
| 1,761,790 | Hill | June 3, 1930 |
| 1,988,162 | Chapman | Jan. 15, 1935 |
| 2,156,432 | McDowell et al. | May 2, 1939 |
| 2,282,843 | Adler | May 12, 1942 |
| 2,420,673 | Monrad | May 20, 1947 |

FOREIGN PATENTS

| Number | Country | Date |
| --- | --- | --- |
| 799,425 | France | June 12, 1936 |